(12) United States Patent
Cotton

(10) Patent No.: US 11,567,263 B2
(45) Date of Patent: Jan. 31, 2023

(54) OPTICAL TARGETING DEVICE

(71) Applicant: Salvo Technologies Inc., Largo, FL (US)

(72) Inventor: Christopher Thomas Cotton, Honeoye Falls, NY (US)

(73) Assignee: ASE Sailing, Inc., Honeoye Falls, NY (US)

( * ) Notice: Subject to any disclaimer, the term of this patent is extended or adjusted under 35 U.S.C. 154(b) by 0 days.

(21) Appl. No.: 16/853,261

(22) Filed: Apr. 20, 2020

(65) Prior Publication Data

US 2020/0333534 A1    Oct. 22, 2020

Related U.S. Application Data

(60) Provisional application No. 62/836,159, filed on Apr. 19, 2019.

(51) Int. Cl.
| | |
|---|---|
| *G02B 27/01* | (2006.01) |
| *F41G 1/01* | (2006.01) |
| *G02B 6/28* | (2006.01) |
| *G02B 5/32* | (2006.01) |

(52) U.S. Cl.
CPC ............. *G02B 6/2848* (2013.01); *G02B 5/32* (2013.01); *G02B 27/0172* (2013.01); *F41G 1/01* (2013.01); *G02B 2027/0174* (2013.01)

(58) Field of Classification Search
None
See application file for complete search history.

(56) References Cited

U.S. PATENT DOCUMENTS

| | | |
|---|---|---|
| 4,711,512 A | 12/1987 | Upatnieks |
| 6,805,490 B2 | 10/2004 | Levola |
| 7,181,108 B2 | 2/2007 | Levola |
| 7,206,107 B2 | 4/2007 | Levola |
| 7,234,265 B1 | 6/2007 | Cheng et al. |
| 7,764,413 B2 | 7/2010 | Levola |
| 8,160,411 B2 | 4/2012 | Levola et al. |
| 8,320,032 B2 | 11/2012 | Levola |
| 9,323,061 B2 * | 4/2016 | Edwards .............. G02B 27/017 |
| 10,345,077 B1 * | 7/2019 | Loebig ................. G03H 1/0005 |

(Continued)

FOREIGN PATENT DOCUMENTS

WO    2018125574 A1    7/2018

*Primary Examiner* — Rhonda S Peace
(74) *Attorney, Agent, or Firm* — John M. Hammond; Patent Innovations LLC

(57) ABSTRACT

An optical targeting device comprised of a support body, an imaging waveguide joined to and in a position relative to the support body, and a light source mounted on the support body. The imaging waveguide is comprised of an input diffractive optic, and an output diffractive optic. The light source is located to direct a targeting light beam to the input diffractive optic of the imaging waveguide. In operation of the optical targeting device, the imaging waveguide simultaneously transmits incoming light from a scene viewable by a user of the device through the light transmissive body, and propagates the targeting light beam from the input diffractive optic laterally through the light transmissive body and directs the targeting light beam outwardly from the output diffractive optic, thereby rendering the targeting light beam as a point of light superimposed within the scene viewable by the user.

23 Claims, 5 Drawing Sheets

(56) References Cited

U.S. PATENT DOCUMENTS

| | | | | |
|---|---|---|---|---|
| 10,345,587 B1* | 7/2019 | Loebig | ............... | G02B 23/105 |
| 10,852,524 B2* | 12/2020 | Havens | ................ | F41G 1/38 |
| 2004/0004767 A1* | 1/2004 | Song | ............... | G02B 27/0172 |
| | | | | 359/566 |
| 2013/0333266 A1* | 12/2013 | Gose | ................ | G01J 1/0219 |
| | | | | 348/340 |
| 2015/0362651 A1* | 12/2015 | Voloschenko | ....... | G03H 1/0486 |
| | | | | 359/9 |
| 2016/0377378 A1 | 12/2016 | Collin | | |
| 2017/0122706 A1* | 5/2017 | Masarik | ............... | F41G 11/003 |
| 2020/0333534 A1* | 10/2020 | Cotton | ............... | G02B 27/0172 |

\* cited by examiner

PRIOR ART

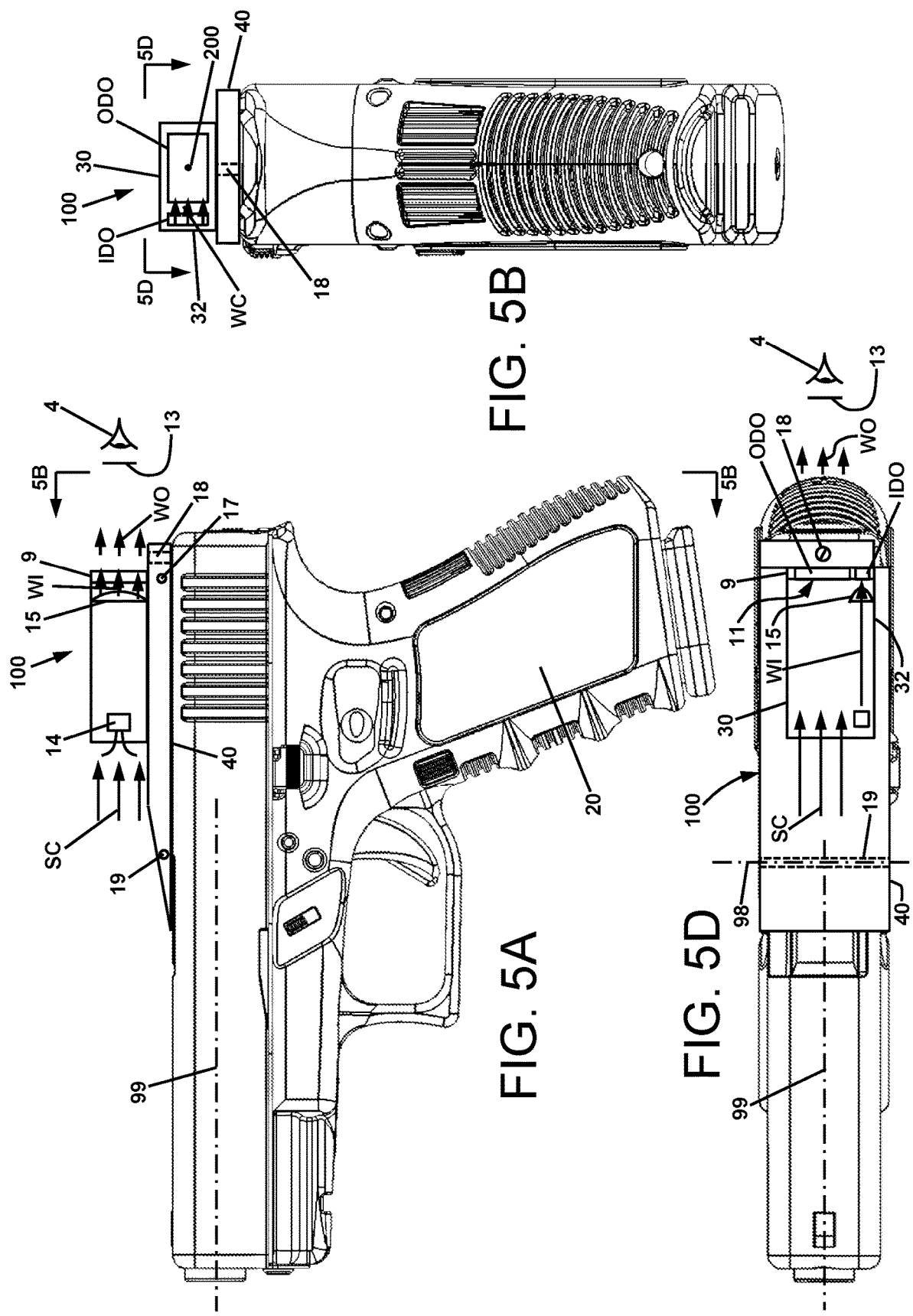

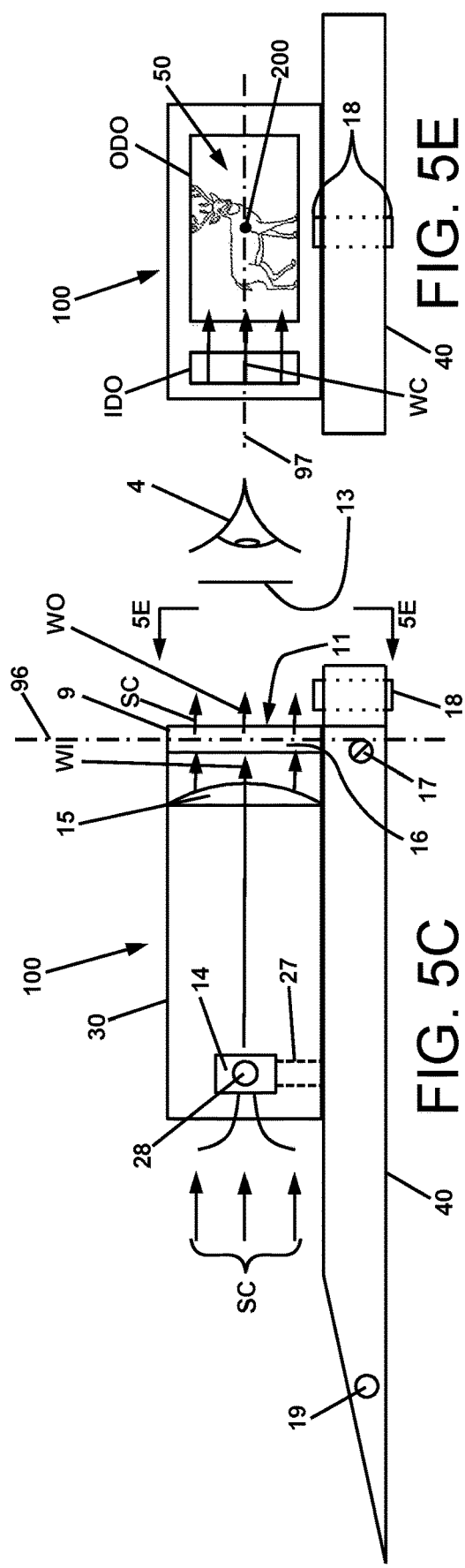
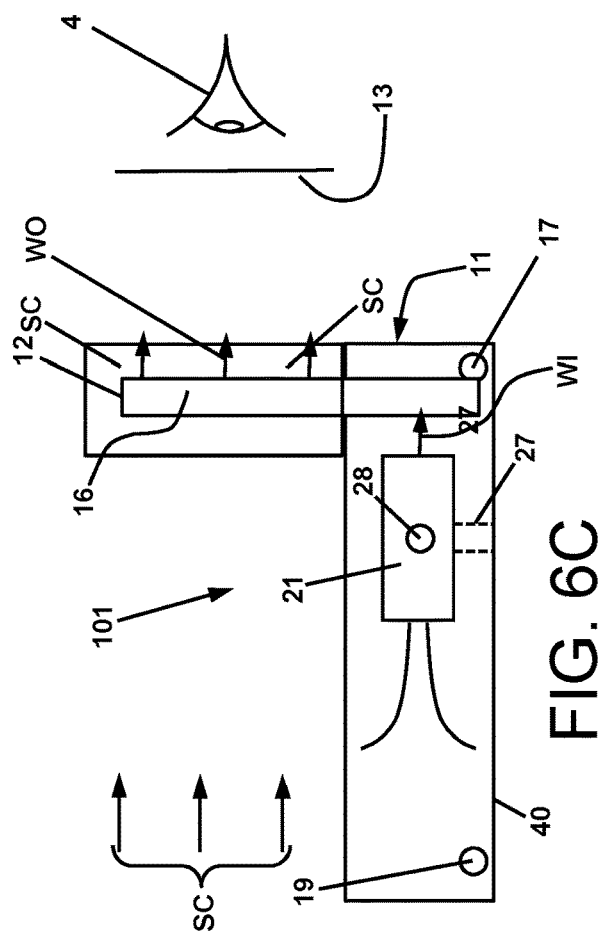

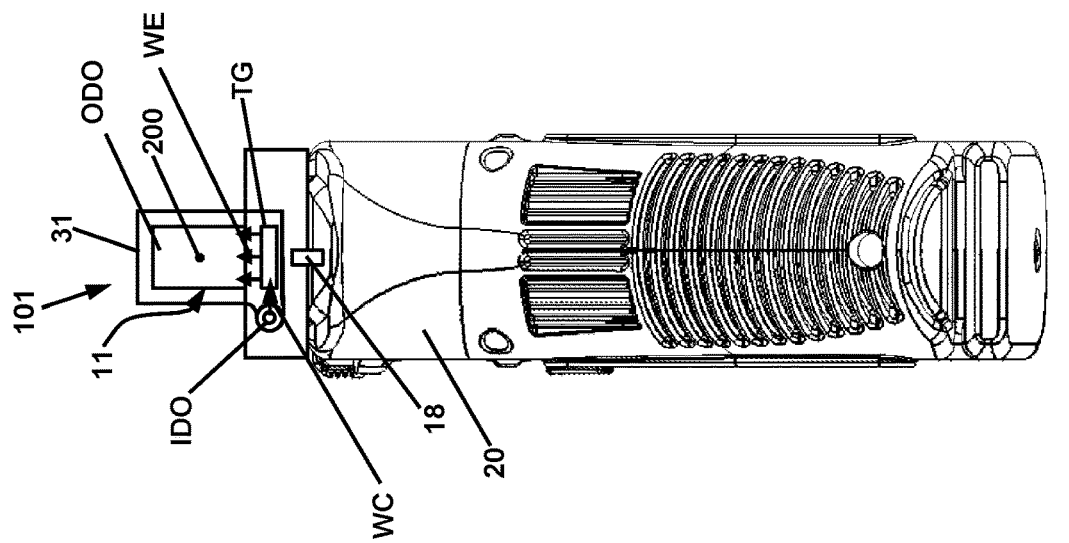
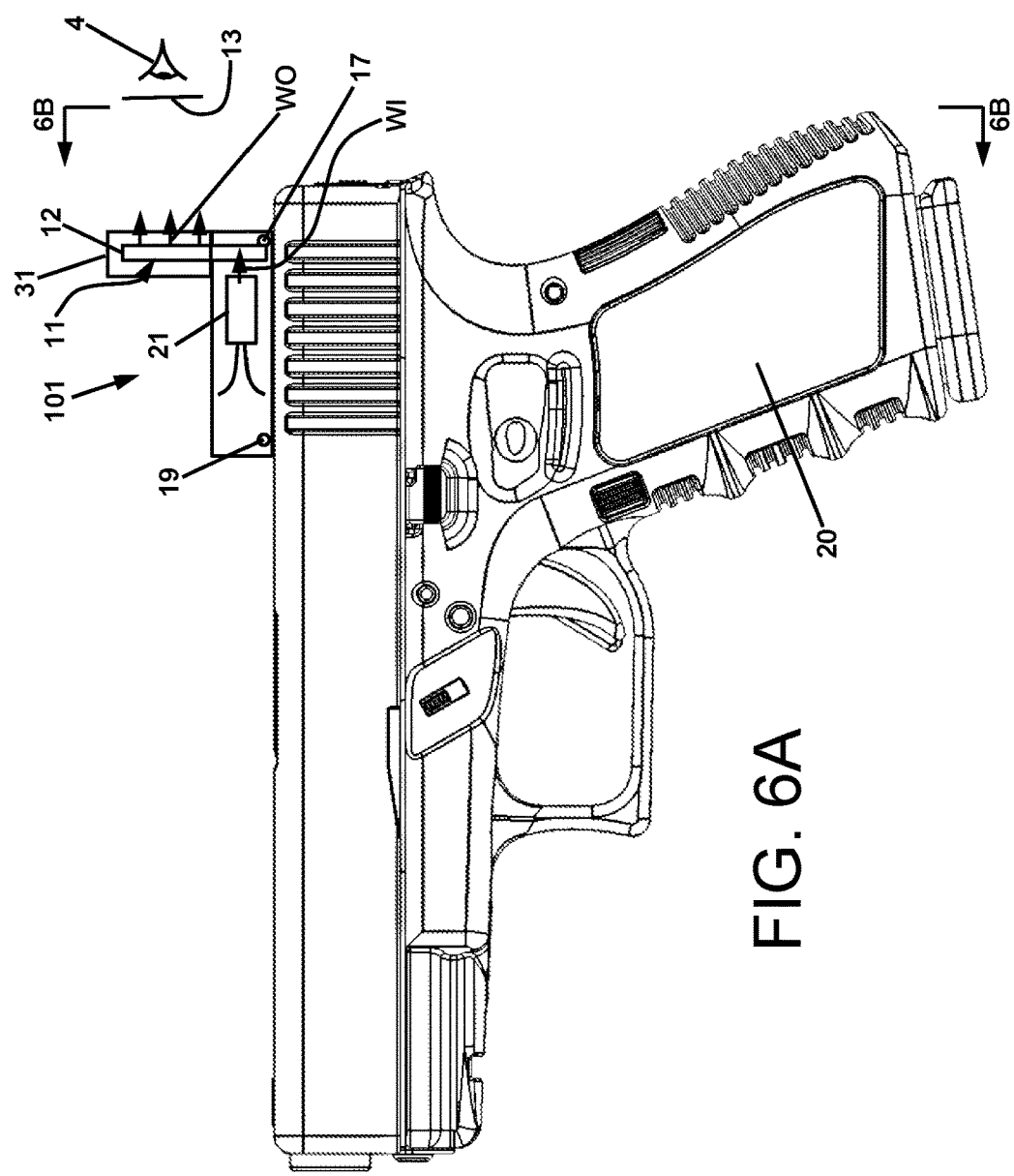

OPTICAL TARGETING DEVICE

CROSS-REFERENCE TO RELATED PATENT APPLICATIONS

This application claims the benefit of U.S. Provisional Patent Application No. 62/836,159 filed Apr. 19, 2019, the disclosure of which is incorporated herein by reference. The above benefit claim is being made in an Application Data Sheet submitted herewith in accordance with 37 C.F.R. 1.76 (b)(5) and 37 C.F.R. 1.78.

BACKGROUND

Technical Field

Sighting devices that generate a reticle or other image for aiming weapons or optical devices.

Description of Related Art

There are several types of sights available in the market to enable a user of a weapon, such as a rifle, shotgun, handgun, or submachine gun, to aim these weapons. Examples of such sighting devises include laser sights, holographic sights, and "reflex" or "red dot" sights.

FIG. 1 schematically illustrates an example of a prior art device as disclosed in United States Patent Application Publication 2016/0377378 of Collin, the disclosure of which is incorporated herein by reference. A light beam from a light source 1 illuminates a mirror 2. The light source 1 may be a laser diode. The mirror 2 then reflects the light beam onto a holographic optical element (HOE) 3 and the HOE 3 reconstructs an image of a reticle. A user's eye 4 can view the image of the reticle and a target (not shown) through the HOE 3. The light beam that illuminates the HOE 3 is not only projected toward the eye 4 but it also escapes in the opposite direction away from the eye 4. A portion of light also passes through the HOE 3 and may illuminate the housing of the sight. This light might be visible to someone at a distance. Furthermore, a user views the target through the HOE 3 and the HOE 3 may reduce the amount of light received by the eye 4 from a target area. It would be desirable to overcome the limitations of existing sights and to provide a better solution. The design of this sight requires a large housing which occludes the scene around the target thus reducing the vision and situational awareness of the shooter. The larger housing also adds weight to the weapon.

FIG. 2 illustrates an internal red dot sight as disclosed in U.S. Pat. No. 7,234,265 of Cheng et al., the disclosure of which is incorporated herein by reference. The sight is comprised of an eye lens 5, an objective lens 6, and a light emitting device 7 adapted to emit light in between the eye lens 5 and the objective lens 6. The eye lens 5 is a planar lens. The objective lens 6 is a concave lens. The eye lens 5 is set in a tilt angle relative to the objective lens 6. When the light emitting device 7 is operated to emit light toward the eye lens 5, the eye lens 5 reflects a point light source of the light emitting device 7, thereby forming a virtual point light source on a major axis of the objective lens 6 subject to the law that incident angle equals angle of reflection. The distance between the point light source of the light emitting device 7 and the eye lens 5 is equal to the distance between the virtual point light source and the eye lens 5. Therefore, the virtual point light source is allocated at a focal point F of the objective lens 6, and a light ray is projected to the objective lens 6 in parallel to the major axis by means of the virtual point light Source. By means of the aforesaid arrangement, the point light source actually emitted by the light emitting device 7 is simulated to be allocated onto the focal point F of the objective lens 6, and then projected onto the objective lens 6 by means of the virtual point light source and then sent out of the objective lens 6 in parallel to the major axis. The dot on the lens is superimposed on the target. According to this structural design, the length of the internal red dot sight 8 is simply the distance between the eye lens 5 and the objective lens 6. Using freespace optics to produce a virtual image of a targeting source inherently requires a large housing which occludes the scene around the target thus reducing the vision and situational awareness of the shooter. The larger housing also adds weight to the weapon. The field of view of this design approach is also limited by the optical performance of the reflector. As the field of view is increased, the length and thereby the weight is also increased. It is desirable that the weight of any accessories attached to a handheld weapon be as small as possible.

In a separate field of optics and imaging devices, Head-Mounted Displays (HMDs) are being developed for a range of diverse uses, including military, commercial, industrial, fire-fighting, and entertainment applications. For many of these applications, there is particular value in forming a virtual image that can be visually superimposed over the real-world image that lies in the field of view of the HMD user. Optical imaging light guides convey image-bearing light to a viewer in a narrow space for directing the virtual image to the viewer's pupil and enabling this superposition function.

In conventional imaging light guides used in such devices, collimated, relatively angularly encoded light beams from an image source are coupled into a planar waveguide by an input coupling such as an in-coupling diffractive optic, which can be mounted or formed on a surface of the planar waveguide or buried within the waveguide. Such diffractive optics can be formed as diffraction gratings, holographic optical elements or in other known ways. For example, the diffraction grating can be formed by surface relief. After propagating along the waveguide, the diffracted light can be directed back out of the waveguide by a similar output grating, which can be arranged to provide pupil expansion along one dimension of the virtual image. In addition, a turning grating can be positioned along the waveguide between the input and output gratings to provide pupil expansion in an orthogonal dimension of the virtual image. The image-bearing light output from the waveguide provides an expanded eye box for the viewer.

FIG. 3 is a schematic diagram that shows a simplified cross-sectional view of one conventional configuration of a monocular type diffractive beam expander or exit pupil expander as disclosed on PCT International Application Publication WO2018/125574 of Shultz et al., the disclosure of which is incorporated herein by reference. The diffractive beam expander or exit pupil expander 9 formed as an imaging light guide 11 comprising an input-coupling-element such as an input-coupling-element diffractive optic (IDO), and an output-coupling-element, such as an output-coupling-element diffractive optic (ODO) arranged on a transparent and planar waveguide or imaging light guide substrate S, alternately termed pupil expander substrate S. In this example, in-coupling diffractive optic IDO is shown as a reflective type diffraction grating; however, in-coupling diffractive optic IDO could alternately be a transmissive diffraction grating, volume hologram or other holographic diffraction element, or other type of optical component that provides diffraction for the incoming, image-bearing light, arranged on a lower surface 10 of the pupil expander substrate S, where the in-coming light beam WI first interacts with the pupil expander substrate S. When used as a part of a virtual display system, in-coupling diffractive optic IDO couples the in-coming light beam WI, via suitable frontend optics (not shown), into the substrate S of imaging light guide 11. The input light is diffracted by in-coupling diffractive optic IDO. A portion of the first order diffracted light forms an imaging light guided light wave WG that propagates along the substrate S, moving toward the right in the FIG. 3 system, toward out-coupling diffractive optic ODO. Between gratings or other types of diffractive elements, light is channeled or directed through the imaging light guide by Total Internal Reflection (TIR). Output-coupling-element ODO contributes to beam expansion, along the x-axis in the view of FIG. 3, and couples the light that it receives through substrate S, directing the light outwards, towards the observer.

The diffractive optics (IDO and ODO) which serve as the input-coupling-elements and output-coupling-elements may be replaced by mirrors, prisms, or other optical means (not shown).

The perspective view of FIG. 4 shows a conventional beam expander 12 that is configured as an imaging light guide and that provides beam expansion along x—and y-axes of the intended image using an intermediate turning grating TG to redirect the light output (first diffracted mode) from input-coupling-element IDO to output-coupling-element diffractive optic ODO. In the FIG. 4 device, input-coupling-element diffractive optic IDO containing periodic rulings with a period d receives incoming input optical beam WI representing a light source. A full range of angularly encoded beams for producing a virtual image can be generated by a display together with focusing optics, by a beam scanner for more directly setting the angles of the beams, a laser, a holographic image forming device, or by a combination such as a one-dimensional real display used with a scanner. Beam expander 12 provides an expanded output beam from out-coupling diffractive optic ODO by using intermediate grating TG. Intermediate grating TG provides beam expansion in the y-axis direction and has an angular orientation of diffractive optics and a spacing geometry determined by spacing period d periodicity and the difference in angle of the diffraction features between diffractive optic IDO and diffractive optic ODO.

In considering a light guide design used for imaging, it should be noted that image-bearing light traveling within an imaging light guide such as a conventional waveguide is effectively encoded by the in-coupling optics, whether the in-coupling mechanism uses gratings, holograms, prisms, mirrors, or some other mechanism. Any reflection, refraction, and/or diffraction of light that takes place at the input must be correspondingly decoded by the output in order to re-form the virtual image that is presented to the viewer. Out-coupling diffractive optic ODO directs the image-bearing light to an eyebox, shown schematically as eyebox 13 in FIG. 4. The letter "R" represents the orientation of the virtual image that is formed so that it is visible to the viewer whose eyes are in proximity to eyebox 13.

A turning grating, placed at an intermediate position between the input and output diffraction elements, is typically chosen so that it does not induce any change on the encoded light. If, for example, the pitch of the turning grating matches the input and output diffraction elements, it is oriented at 45 degrees to the input and output diffraction elements in such a way that the encoded ray bundles are turned 90 degrees by one of the 1st reflection orders of the diffraction elements. This diffraction only acts on the vector component of the incoming rays that are parallel to the grating vector of the turning grating. This is evident by the fact that such turning gratings redirect ray bundles within the guide substrate, but do not change the encoded angular information of the virtual image. The resultant virtual image in such a designed system is not rotated. Further, if such a system did introduce any rotation to the virtual image, it would do so non-uniformly across different field angles and wavelengths of light, thus causing unwanted distortions or chromatic aberrations in the resultant virtual image.

The use of turning grating TG provides an inherent geometrical accuracy to the design of beam expander 12 so that the input beam and output beam are symmetrically oriented with respect to each other. With proper grating TG spacing and orientation, grating vectors k direct the light from the input-coupling-element diffractive optic IDO to the output-coupling element diffractive optic ODO with grating vector $k_1$. Grating vectors extend in a direction that is normal to the grooves of the diffraction grating and with a magnitude inverse to the pitch (distance between grooves). Image symmetry is shown for an image of the letter 'R' in FIG. 4. It should be noted that the image that is formed for the imaging light guide viewer is a virtual image, focused at infinity, but with the relative orientation of output image content to input image content as represented in FIG. 4. A change in the rotation about the z axis or angular orientation of incoming light wave WI with respect to the x-y plane causes a corresponding symmetric change in rotation or angular orientation of outgoing light from out-coupling diffractive optic ODO. From the aspect of image orientation, turning grating TG simply acts as a type of optical relay, providing magnification along one axis of the image that is input at in-coupling diffractive optic IDO to out-coupling diffractive optic ODO. Turning grating TG is typically a slanted or square grating or, alternately, can be a blazed grating.

Beam expansion in two different dimensions is provided when using the arrangement of FIG. 4. Turning grating TG expands the diffracted beam from in-coupling diffractive optic IDO in the y direction as shown. Out-coupling diffractive optic ODO further expands the diffracted beam in the x direction, orthogonal to the y direction as shown.

The conventional imaging light guide beam expander 9 that is shown in FIGS. 3 and 4 is used in a number of existing head-mounted device (HMD) designs for providing image content to a viewer. This type of beam expander is particularly well-suited to augmented reality applications in which image content can be superimposed on a real-world view as seen through the transparent imaging light guide.

Input-coupling-elements and output-coupling-element diffractive optics IDO and ODO can be diffraction gratings or formed as volume holograms, or formed from a holographic polymer dispersed liquid crystal, for example. The waveguide substrate S of the beam expander is typically glass or other optical material with sufficient index of refraction for supporting TIR transmission between input-coupling-element diffractive optic, distribution gratings, and output-coupling-element diffractive optic.

Input-coupling-element diffractive optics IDO, distribution gratings and output-coupling-element diffractive optics ODO can have different grating periods appropriate to their functions. After proper surface preparation of a glass substrate blank, the diffraction components can be formed on one or both outer surfaces of the beam expander using nano-imprinting.

The prior art red-dot targeting devices previously are limited in the amount of open field of view that they can provide without adding excessive weight to the system. Additionally, the housing of such a sight, which is required to mount the light source at a distance from the viewing element of the sight, also occludes the scene from the viewer. There is a need for a compact optical sight, which has a large field of view and a simple optical configuration, and which is light in weight.

SUMMARY

The problem of a weapon sight (also referred to herein as a targeting device) having a simple configuration, a large open field of view, and a structure that is light in weight is solved by the weapon sight of the present disclosure, which incorporates a waveguide to produce a targeting reference point. The sight of the present disclosure provides the targeting reference point within a very large open field of view, while having minimal optical components and reduced weight compared to conventional optical sighting devices.

According to one aspect of the present disclosure, an optical targeting device is provided comprising a support body, a light source mounted on the support body, and an imaging waveguide defining a light path that conveys light from the light source. The waveguide may be formed as a flat plate having a front surface and a back surface that extend in parallel. Along the light path, an input-coupling element may be formed on the front surface as a first grating vector. The input-coupling element diffracts light from the light source into the waveguide and directs the diffracted light along the light path according to the first grating vector. An out-coupling diffractive element may also be formed on the front surface in a position along the light path that is spaced apart from the in-coupling diffractive element. The out-coupling diffractive element diffracts a light beam from the light source out of the waveguide to a user of the optical targeting device. The light that is coupled out of the waveguide is then viewable by the user. The imaging waveguide is adapted to simultaneously transmit incoming light from a scene viewable by the user of the device through imaging waveguide, and direct a point image of the light source to the user of the optical targeting device, thereby rendering the point image of the light source superimposed within a scene viewable by the user. The location of the point image of the light source within the scene viewable by the user may be adjusted. The location of the point image of the light source may be adjusted to coincide with a target point in the scene viewable by the user.

According to another aspect of the present disclosure, an optical targeting device is provided that is comprised of a support body, an imaging waveguide joined to and in a position relative to the support body, and a light source mounted on the support body. The imaging waveguide is comprised of an input diffractive optic contiguous with a light transmissive body, and an output diffractive optic contiguous with the light transmissive body. The light source is located to direct a targeting light beam to the input diffractive optic of the imaging waveguide at an angle of incidence to the input diffractive optic. In operation of the optical targeting device, the imaging waveguide simultaneously transmits incoming light from a scene viewable by a user of the device through the light transmissive body, and propagates the targeting light beam from the input diffractive optic laterally through the light transmissive body and directs the targeting light beam outwardly from the output diffractive optic, thereby rendering the targeting light beam as a point of light superimposed within the scene viewable by the user.

In certain embodiments, the support body of the device is comprised of a hollow housing, wherein the light source is disposed within the hollow housing. The light source may be disposed proximate to a side wall of the hollow housing, In such an embodiment, the light from the scene may be transmitted through the light transmissive body substantially parallel to the targeting light beam from the light source. The light from the scene may be transmitted through the hollow housing substantially parallel to the targeting light beam from the light source and subsequently through the light transmissive body.

Adjustments are provided in the device so that the position of the point of light superimposed within the scene may be adjusted to coincide with a target point in the scene. When the device is mounted on a weapon, the target point in the scene may be the impact point of a projectile that is fired by the weapon.

In one embodiment of the optical targeting device in which the point of light superimposed within the scene may be adjusted to coincide with a target point in the scene, the device is further comprised of a mounting fixture joined to the support body of the device and pivotably joined to a directionally dependent device. In general, a "directionally dependent device" is a device in which the use or proper function thereof is dependent on the ability to aim or orient the device in a specific direction. Exemplary non-lethal directionally dependent devices include but are not limited to a camera, a surveying device, a medical device, and an infrared optical sensing device. Lethal directionally dependent devices, i.e., weapons, include but are not limited to a rifle, a handgun, a pistol, a cannon, a grenade launcher, a missile, a crossbow, and an archery-bow. Such weapons are adapted to fire a projectile at a target point in the scene.

The mounting fixture is comprised of a first adjustment mechanism operable to adjust the position of the support body and imaging waveguide relative to the directionally dependent device around a first axis perpendicular to a longitudinal axis of the directionally dependent device, and a second adjustment mechanism operable to adjust the position of the support body and imaging waveguide relative to the directionally dependent device around a second axis perpendicular to the longitudinal axis of the directionally dependent device. In embodiments in which the directionally dependent device is a weapon adapted to fire a projectile at a target point in the scene, the longitudinal axis is the central axis of the projectile-firing barrel of the weapon.

Adjustment of at least one of the first adjustment mechanism and the second adjustment mechanism causes the point of light superimposed within the scene viewable by the user to coincide with the target point in the scene viewable by the user. The target point in the scene is preferably the impact point of a projectile that is fired by the weapon.

In another embodiment of the optical targeting device in which the point of light superimposed within the scene may be adjusted to coincide with a target point in the scene, the device may be further comprised of a mounting fixture joined to the support body of the device. The mounting fixture is adapted to be removably joined to a directionally dependent device. In such an embodiment, the mounting fixture is comprised of a first adjustment mechanism operable to adjust an angle of the in-coming light beam relative to the support body around a first axis perpendicular to the incoming light from the scene, and a second adjustment mechanism operable to adjust the angle of the in-coming light beam relative to the support body around a second axis perpendicular to the incoming light from the scene. Adjustment of one or both of the first adjustment mechanism and the second adjustment mechanism causes the point of light superimposed within the scene viewable by the user to move to a different location within the scene viewable by the user. In embodiments in which the optical targeting device is mounted on a weapon, the adjustment of the first adjustment mechanism and/or the second adjustment mechanism causes the point of light superimposed within the scene viewable by the user to move to the target point in the scene viewable by the user.

In certain embodiments, the light source may be a light emitting diode (LED). In certain embodiments, the light source may be a laser. In certain embodiments, the light source may be a holographic reticle. In certain embodiments, the light source may be an illuminated reticle.

According to another aspect of the present disclosure, an optical targeting device is provided that is comprised of a support body, an image projection source mounted on the support body, and an imaging waveguide joined to and in a position relative to the support body and comprising an input-coupling-element and an output-coupling-element operable to direct a projected image from the image projection source to a user of the optical targeting device. The imaging waveguide is adapted to simultaneously transmit incoming light from a scene viewable by the user of the device through imaging waveguide, and direct the projected image to the user of the optical targeting device, thereby rendering the projected image superimposed within the scene viewable by the user.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

The present disclosure will be provided with reference to the following drawings, in which like numerals refer to like elements, and in which:

FIG. 5A is a side elevation schematic diagram of a first embodiment the imaging waveguide targeting device of the present disclosure;

FIG. 5B is an end elevation schematic diagram of the first embodiment of the imaging waveguide targeting device taken along line 5B-5B of FIG. 5A;

FIG. 5C is a detailed side elevation schematic diagram of the imaging waveguide targeting device of FIG. 5A;

FIG. 5D is top view schematic diagram of the first embodiment of the imaging waveguide targeting device taken along line 5D-5D of FIG. 5B;

FIG. 5E is an end view schematic diagram of the imaging waveguide targeting device of FIG. 5A taken along line 5E-5E of FIG. 5C;

FIG. 6A is a side elevation schematic diagram of a second embodiment the imaging waveguide targeting device of the present disclosure;

FIG. 6B is an end elevation schematic diagram of the second embodiment of the imaging waveguide targeting device taken along line 6B-6B of FIG. 6A; and FIG. 6C is a detailed side elevation schematic diagram of the imaging waveguide targeting device of FIG. 6A.

Figure 1:
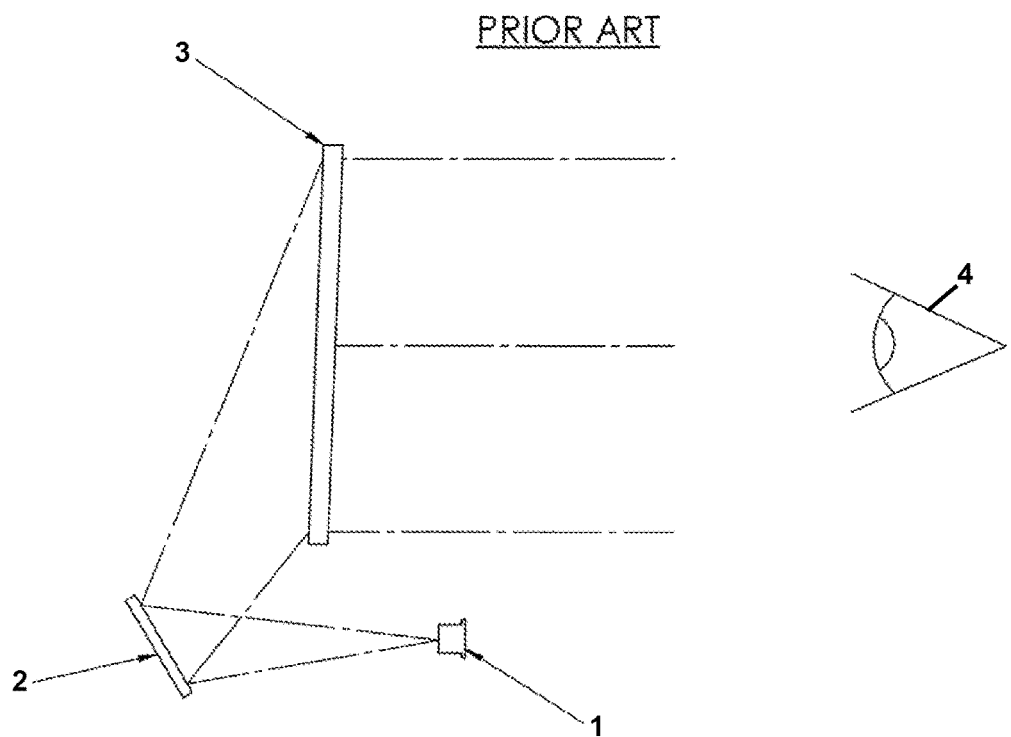
FIG. 1 is a light path diagram of an example of a prior art sighting device.
Figure 2:
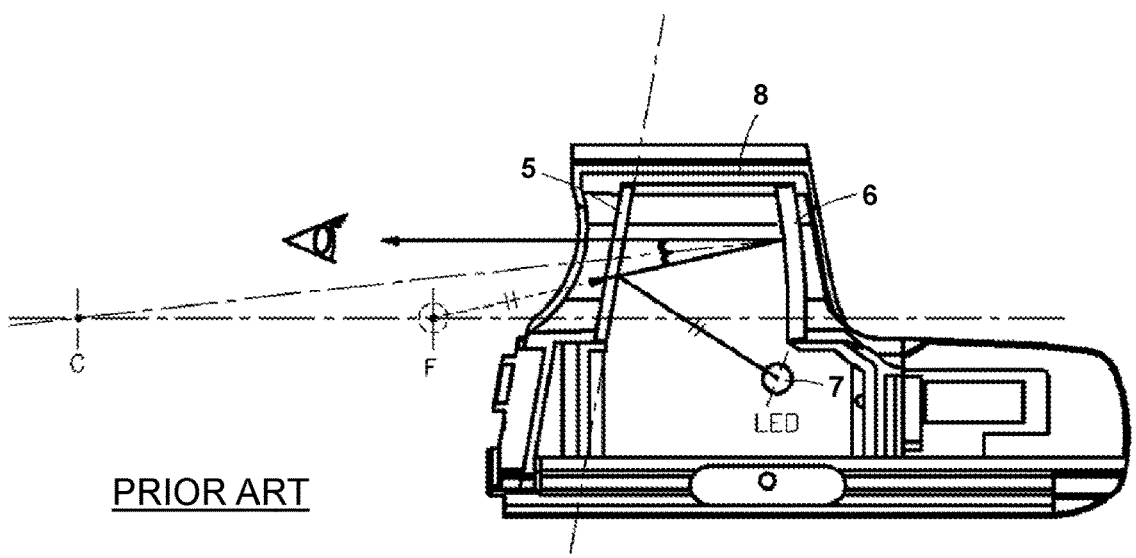
FIG. 2 is a schematic side view showing the arrangement of an eye lens, an objective lens and a light emitting device in a prior art internal red dot sight.

The present invention will be described in connection with certain preferred embodiments. However, it is to be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION

For a general understanding of the present invention, reference is made to the drawings. In the drawings, like reference numerals have been used throughout to designate identical elements. The drawings are to be considered exemplary, and are for purposes of illustration only. The dimensions, positions, order and relative sizes reflected in the drawings attached hereto may vary.

Aspects of the present disclosure relate generally to sighting devices that generate a reticle or other image for aiming weapons or optical devices. Certain versions of the present invention are considered compact and intended for use with a handheld weapon or optical device, with "compact" being defined as occupying little space compared with others of its type. Accordingly, some versions of a sight of the present invention are significantly smaller and occupy less space as compared to similar targeting devices. A handheld optical device may be a camera, a surveying device, a medical device, an infrared optical sensing device, or any other small optical device which requires targeting. Furthermore, "handheld weapon" may be defined as being for use with a rifle, handgun, pistol, crossbow, archery-bow, etc. or any other known weapon used in a handheld manner. "Handheld" may also include weapons or optical systems mounted to a tripod (or other mount) but small in nature (small compared to a vehicle or airplane). Handheld may include all other nonvehicle (e.g., a tank) weapons.

Certain versions of the sight may also have adjustments for compensating for windage, elevation, temperature and/or other factors. A sighting or targeting device according to the present disclosure may take a variety of forms.

For a general understanding of sighting devices of the present disclosure, reference is made to the drawings. In the drawings, like reference numerals have been used throughout to designate identical elements. The drawings are to be considered exemplary, and are for purposes of illustration only. The dimensions, positions, order and relative sizes reflected in the drawings attached hereto may vary.

In the following disclosure, the present invention is described in the context of its use as a sighting device for a weapon. However, it is not to be construed as being limited only to use in weapon sighting. The invention is adaptable to any use in which precise alignment or aiming of an object or tool is desirable to be provided from a sighing device. Additionally, this disclosure may identify certain components with the adjectives "top," "upper," "bottom," "lower," "left," "right," etc. These adjectives are provided in the context of the orientation of the drawings, which is arbitrary. The disclosure is not to be construed as limiting the sight to use in a particular spatial orientation. The instant sighting device may be used in orientations other than those shown and described herein.

The present disclosure is directed in particular to elements forming part of, or cooperating more directly with, apparatus in accordance with the invention. It is to be understood that elements not specifically shown or described may take various forms well known to those skilled in the art.

Where they are used herein, the terms "first", "second", and so on, do not necessarily denote any ordinal, sequential, or priority relation, but are simply used to more clearly distinguish one element or set of elements from another, unless specified otherwise.

In the present disclosure, the terms "viewer", "operator", "observer", and "user" may be used. These terms are considered to be equivalent and refer to a person who views images provided by the sighting device of the present disclosure.

In the context of the present disclosure, the terms "wavelength band" and "wavelength range" are equivalent and have their standard connotation as used by those skilled in the art of color imaging and refer to a continuous range of light wavelengths that are used to represent polychromatic images. Different wavelength bands may be directed through different color channels, such as to provide red, green, and blue primary colors in conventional color imaging applications.

It is also to be understood that any connection references used herein (e.g., attached, coupled, connected, and joined) are to be construed broadly and may include intermediate members between a collection of elements and relative movement between elements unless otherwise indicated. As such, connection references do not necessarily imply that two elements are directly connected and in fixed relation to each other.

A component for optical coupling allows light energy to be input to, or output from, an optical apparatus. The terms "beam expander" and "pupil expander" are considered to be synonymous, used interchangeably herein.

FIGS. 5A-5E depict a first embodiment of an optical targeting device 100 of the present disclosure. The optical targeting device 100 is comprised of a support body 30, an imaging waveguide 11 joined to and in a position relative to the support body 30, and a light source 14 mounted on the support body. The imaging waveguide 11 is comprised of an input diffractive optic IDO contiguous with a light transmissive body 16, and an output diffractive optic ODO contiguous with the light transmissive body 16. The light source 14 is located to direct a targeting light beam WI to the input diffractive optic IDO of the imaging waveguide 11. In operation of the optical targeting device 100, the imaging waveguide 11 simultaneously transmits incoming light SC from a scene 50 viewable by a user (not shown except for eye 4) of the device 100 through the light transmissive body 16, and propagates the targeting light beam WI from the input diffractive optic IDO laterally through the light transmissive body 16 and directs the targeting light beam outwardly from the output diffractive optic ODO as output beam WO, thereby rendering the targeting light beam as a point of light 200 superimposed within the scene 50 viewable by the user. It is to be understood that the point of light 200 is not necessarily a dot of light as shown in FIG. 5E. In certain embodiments, the light source may be a holographic reticle or an illuminated reticle. Thus the point of light may be a reticle pattern superimposed within the scene 50 viewable by the user. As used herein, the term "point of light" may be construed as a dot, or a reticle pattern, depending upon the light source.

In the embodiment depicted in FIGS. 5A-5E, the light source 14 is a light emitting diode (LED). In an alternative embodiments depicted in FIGS. 6A-6C and to be descried subsequently herein, the light source may be a laser 21.

In the embodiment depicted in FIGS. 5A-5E, the support body 30 of the device is comprised of a hollow housing, and the light source 14 is disposed within the hollow housing. In particular, the light source 14 is disposed proximate to a side wall 32 of the hollow housing. In such a configuration, the light SC from the scene is transmitted through the light transmissive body 16 substantially parallel to the targeting light beam WI from the light source 14. The light SC from the scene is transmitted through the hollow housing substantially parallel to the targeting light beam WI from the light source 14 and subsequently through the light transmissive body 16.

In one embodiment of the optical targeting device 100, the point of light 200 superimposed within the scene 50 may be adjusted to coincide with a target point in the scene 50 by changing the angle of the device 100 with respect to the axis 99 of the handheld weapon (which may be defined by the projectile barrel of the weapon) to adjust the sighting of the targeting device 100. In such an embodiment, the device 100 is further comprised of a mounting fixture 40 joined to the support body 30 of the device 100 and pivotably joined to a directionally dependent device such as weapon/handgun 20. The mounting fixture 40 is comprised of a first adjustment mechanism 18 such as e.g., an adjustment screw 18, which is operable to adjust the position of the support body and imaging waveguide relative to the directionally dependent device around a first axis 98 perpendicular to the projectile axis 99 of the weapon 20, and a second adjustment mechanism 17 such as e.g., an adjustment screw 17, operable to adjust the position of the support body and imaging waveguide relative to the directionally dependent device around a second axis perpendicular to the projectile axis 99 of the weapon 20. The first axis 98 may be defined by a pin 19, which pivotably attaches mounting fixture 40 to the weapon 20. The second axis (not shown) may be defined as an axis extending orthogonally through the intersection of axes 99 and 98. Other locations for the second axis may be suitable as long as it is substantially orthogonal to axes 99 and 98. In embodiments in which the directionally dependent device is a weapon 20 adapted to fire a projectile at a target point in the scene, adjustment of at least one of the first adjustment mechanism 18 and the second adjustment mechanism 17 causes the point of light 200 superimposed within the scene 50 viewable by the user to coincide with the target point in the scene viewable by the user. The target point in the scene is preferably the impact point of a projectile that is fired by the weapon 200.

In another embodiment of the optical targeting device 100, the point of light 200 superimposed within the scene 50 may be adjusted to coincide with a target point in the scene 50 by adjusting the position of the incoming targeting light beam WI relative to the support body 30. In such an embodiment, the optical targeting device 100 may be further comprised of a mounting fixture 40 joined to the support body 30 of the device 100. The mounting fixture 40 is adapted to be removably joined to a directionally dependent device such as the exemplary handgun shown in FIGS. 5A, 5B, and 5D. The mounting fixture 40 may be comprised of a first adjustment mechanism such as an adjustment screw and cam 28 in contact with the light source 14 or 21 of the incoming targeting light beam WI, which is operable to adjust the angle of the incoming targeting light beam WI relative to the support body 30 around a first axis 96 perpendicular to the incoming light SC from the scene, and a second adjustment mechanism such as e.g., an adjustment screw and cam 27 in contact with the light source 14 or 21, operable to adjust the angle of the in-coming targeting light beam WI relative to the support body 30 around a second axis 97 perpendicular to the incoming light SC from the scene. Adjustment of one or both of the first adjustment mechanism 18 and the second adjustment mechanism 17 causes the point of light 200 superimposed within the scene 50 viewable by the user to move to a different location within the scene 50 viewable by the user. In the embodiments in which the optical targeting device is mounted on a weapon such as e.g., handgun 20 of FIGS. 5A, 5B, and 5D, the adjustment of the first adjustment mechanism 18 and/or the second adjustment mechanism 17 causes the point of light 200 superimposed within the scene 50 viewable by the user to move to a target point in the scene 50 viewable by the user, as shown in FIG. 5E in particular. It is noted that the locations of the axes 97 and 96 may vary from that show in FIGS. 5C and 5E, as long as the incoming targeting light beam WI can be pivotably moved around them.

Figure 3:
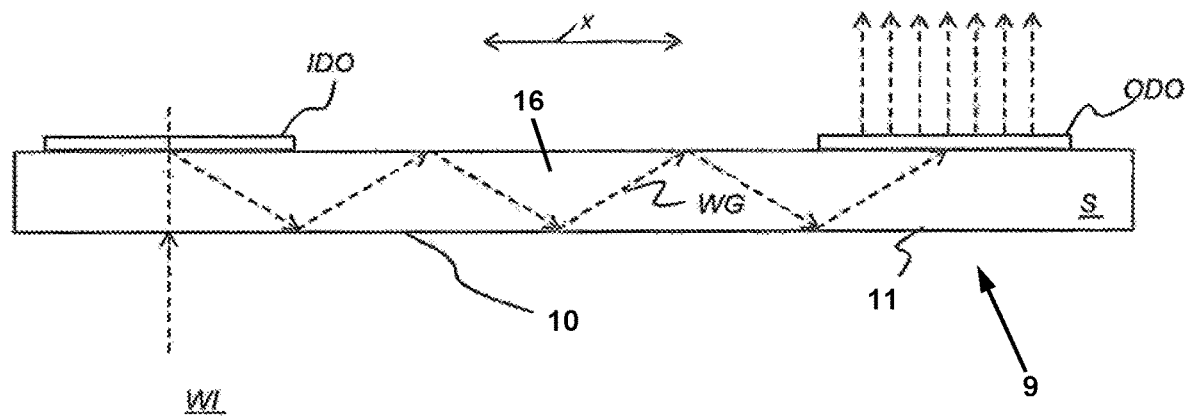
FIG. 3 is a schematic diagram that shows a simplified cross-sectional view of a diffractive beam expander of the prior art used in imaging for Head-Mounted Displays.

Referring again to FIGS. 5A-5E, during use of the device 100, the incoming light wave WI passing through the waveguide 11 provides the point of light 200 superimposed in the scene 50. The incoming light wave WI is produced by a LED 14 that is collimated with a lens 15. In one exemplary embodiment, the wavelength of the incoming light is in the range of 600 nm to 700 nm and is within the visual spectrum so that the point of light 200 is seen by the user as a red dot in the scene 50. This embodiment may utilize a waveguide 11 as illustrated in FIG. 3. Incoming light WI is coupled into the waveguide 11 by the input-coupling-element diffractive optic IDO. In an exemplary embodiment, the pitch of the grating used for input-coupling-element diffractive optic IDO may be 480-500 nm. In an exemplary embodiment, the waveguide 11 may be a 1 mm thick piece of glass with a refractive index of approximately 1.65.

The virtual image of the targeting reference WC is coupled out of the waveguide by the output-coupling-element which is an ODO. The light WO that is coupled out forms a virtual image of a point of light 200 that is formed so that it is visible within the scene 50 to eyes 4 of a viewer, whose eyes 4 are in proximity to eyebox 13, defined as a rectangular area near eyes 4, through which the image is projected. The pitch of the grating used for the ODO may be substantially equal to the pitch of the grating used for the IDO. In one exemplary embodiment, the IDO may be 2.0 mm wide and 10.0 mm high. The ODO may be 19.0 mm wide and 10.0 mm high. It is preferable that incoming light WI covers the entire height of the IDO to produce a virtual image that is viewable over the entire height of the ODO.

It is to be understood that either the IDO or the ODO may be comprised of a static holographic element that produces a range of angles which, when used with a light source that is focused at infinity, will create a holographic reticle pattern. The targeting reference image may also be produced by a laser beam (not shown), a dynamic image forming device such as a projector (not shown), or a static image forming device such as a reticle or a holographic reticle (not shown). The image that is formed by the targeting reference image WI must be substantially imaged to either positive infinity (a real image at infinity) or negative infinity (a virtual image at infinity). For the purposes of this disclosure, infinity is considered to be a distance greater than 6.0 meters, which is the standard far-point definition used in visual systems. It should be noted that either the input-coupling-element diffractive optic IDO or the output-coupling-element diffractive optic ODO may be comprised of a static holographic element (not shown) that produces a range of angles, which when used with a light source that is focused at infinity, will create a holographic reticle pattern.

FIGS. 6A-6C depict a second embodiment of an imaging waveguide targeting device 101 of the present disclosure. Referring to FIGS. 6A-6C, the targeting reference image WI in this embodiment may be a collimated beam provided by a laser 21 as the light source. In one exemplary embodiment, the collimated laser beam may be 4.0 mm in diameter. The wavelength for this embodiment may be in the range of 600 nm to 700 nm and is within the visual spectrum. Incoming light WI is coupled into the waveguide 11 by the input-coupling-element diffractive optic IDO. The pitch of the grating used for the IDO may be 480-500 nm. The waveguide 11 may be made of a 1.0 mm thick piece of glass with a refractive index of approximately 1.65.

Figure 4:
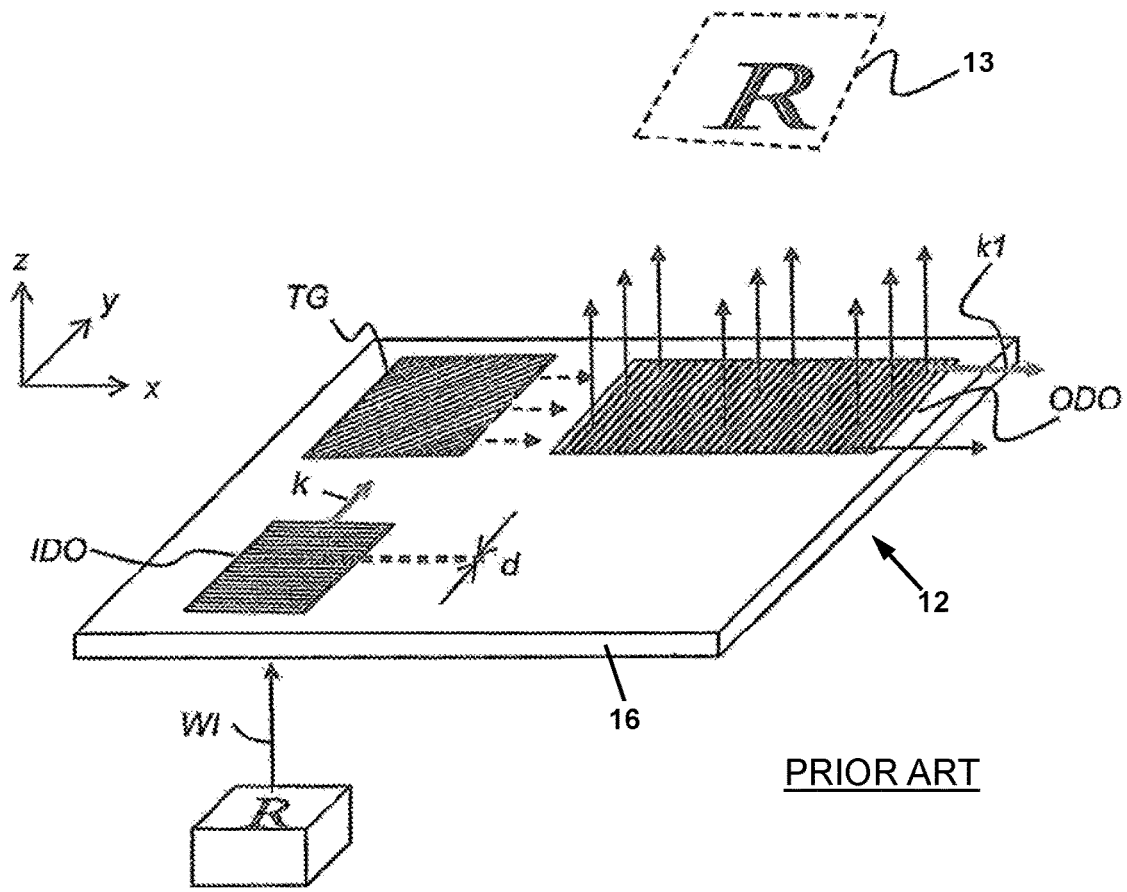
FIG. 4 is a perspective view of a prior art diffractive beam expander that also includes a turning grating.

This second embodiment utilizes a beam expander as illustrated in FIG. 4. Beam expander 12 provides an expanded output beam from output-coupling-element diffractive optic ODO by using intermediate grating TG to turn and expand the coupled light WC. Intermediate grating TG provides beam expansion in the y-axis direction and may have an angular orientation of 45 degrees and a pitch substantially equal to 0.7072 times the pitch of the input-coupling-element diffractive optics IDO and the output-coupling-element diffractive optics ODO.

The expanded virtual image WE of the targeting reference inside the waveguide 11 is coupled out of the waveguide 11 by the output-coupling-element diffractive optic ODO. The light WO that is coupled out forms a virtual image that is formed so that it is visible to eyes 4 of a viewer, whose eyes 4 are in proximity to eyebox 13. The pitch of the grating used for the output-coupling-element diffractive optic ODO is substantially equal to the pitch of the grating used for the input-coupling-element diffractive optic IDO. In one exemplary embodiment of device 101, the IDO may be 4.0 mm in diameter. The area of the TG may be approximately 4.0 mm high and 25.0 mm long. The ODO may be 25.0 mm wide and 35.0 mm high.

The imaging waveguide targeting device 101 may be mounted to the handheld weapon 20 with a mount with adjustments to allow for the apparent location of the virtual targeting reference image WO to be adjusted. As described previously, it is desired that the adjustments change the angle of the imaging waveguide targeting device 101 with respect to the projectile axis 99 of the handheld weapon 20 to adjust the sighting of the targeting device 101. The adjustments are achieved by the use of locking adjustment screws 17 and 18 that rotate the entire targeting device about a pivot point 19. An alternate method for producing this adjustment is to adjust the angle of the targeting reference image WI by pivoting the in-coming light beam WI relative to the support body 30 as described previously.

It is noted that although an LED 14 is shown as the light source in the device embodiment of FIGS. 5A-5E, and a laser 21 is shown as the light source in the device embodiment of FIGS. 6A-6C, the use of a laser or an LED is suitable in either embodiment. In alternative embodiments, a holographic reticle or an illuminated reticle may be used as the light source. In another embodiment, the light source may be an image projection source. In such an embodiment, the imaging waveguide 11 is adapted to simultaneously transmit incoming light from a scene viewable by the user of the device 100/101 through imaging waveguide 11, and direct the projected image to the user of the optical targeting device 100/101, thereby rendering the projected image superimposed within the scene viewable by the user.

Additionally, although the device 100 of FIGS. 5A-5E is configured with a field of view in landscape orientation (long FOV dimension horizontal), and the device 101 of FIGS. 6A-6C is configured with a field of view in portrait orientation (long FOV dimension vertical), devices 100 and 101 may be provided in either landscape of portrait configuration.

It is therefore apparent that there has been provided, in accordance with the present disclosure, a sighting device for a handheld weapon or optical device. The foregoing description of technology and the invention is merely exemplary in nature of the subject matter, manufacture, and use of the invention and is not intended to limit the scope, application, or uses of any specific invention claimed in this application or in such other applications as may be filed claiming priority to this application, or patents issuing therefrom. The following definitions and non-limiting guidelines must be considered in reviewing the description.

The headings in this disclosure (such as "Background" and "Summary") and sub-headings used herein are intended only for general organization of topics within the present technology, and are not intended to limit the disclosure of the present technology or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

To the extent that other references may contain similar information in the Background herein, said statements do not constitute an admission that those references are prior art or have any relevance to the patentability of the technology disclosed herein. Any discussion in the Background is intended merely to provide a general summary of assertions.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the inventive scope of the present disclosure.

The term "providing", such as for "providing a waveguide" and the like, if recited in the claims, is not intended to require any particular delivery or receipt of the provided item. Rather, the term "providing" is merely used to recite items that will be referred to in subsequent elements of the claim(s), for purposes of clarity and ease of readability.

The terms "about" and "substantially" are used herein with respect to measurable values and ranges due to expected variations known to those skilled in the art (e.g., limitations and variabilities in measurements).

The description and specific examples, while indicating embodiments of the technology disclosed herein, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

Unless otherwise specified, relational terms used in the present disclosure should be construed to include certain tolerances that those skilled in the art would recognize as providing equivalent functionality. By way of example, the term perpendicular is not necessarily limited to 90.00°, but also to any variation thereof that those skilled in the art would recognize as providing equivalent functionality for the purposes described for the relevant member or element. Terms such as "about" and "substantially" in the context of configuration relate generally to disposition, location, and/or configuration that is either exact or sufficiently close to the location, disposition, or configuration of the relevant element to preserve operability of the element within the invention while not materially modifying the invention. Similarly, unless specifically specified or clear from its context, numerical values should be construed to include certain tolerances that those skilled in the art would recognize as having negligible importance, as such do not materially change the operability of the invention.

As referred to herein, all compositional percentages are by weight of the total composition, unless otherwise specified. As used herein, the words "comprise," "include," contain," and variants thereof are intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting ingredients, components or process steps, the Applicants specifically envision embodiments consisting of, or consisting essentially of, such ingredients, components or processes excluding additional ingredients, components or processes (for consisting of) and excluding additional ingredients, components or processes affecting the novel properties of the embodiment (for consisting essentially of), even though such additional ingredients, components or processes are not explicitly recited in this application. For example, recitation of a composition or process reciting elements A, B, and C specifically envisions embodiments consisting of, and consisting essentially of, A, B, and C, excluding an element D that may be recited in the art, even though element D is not explicitly described as being excluded herein.

Having thus described the basic concept of the invention, it will be apparent to those skilled in the art that the foregoing detailed disclosure is intended to be presented by way of example only, and is not limiting. Various alterations, improvements, and modifications will occur to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be expressly stated in the claims.

I claim:

1. An optical targeting device comprising:
   a) a support body;
   b) an imaging waveguide joined to and in a position relative to the support body and comprising an input diffractive optic contiguous with a light transmissive body including first and second parallel walls, and an output diffractive optic contiguous with the light transmissive body; and
   c) a light source mounted on the support body and located to direct a targeting light beam to the input diffractive optic of the imaging waveguide;
   wherein the imaging waveguide is adapted to simultaneously transmit incoming light from a scene viewable by a user of the device through the light transmissive body, and propagate the targeting light beam from the input diffractive optic laterally through the waveguide by multiple reflections between the first and second parallel walls of the waveguide and direct the targeting light beam outwardly from the output diffractive optic, thereby rendering the targeting light beam as a point of light superimposed within the scene viewable by the user.

2. The optical targeting device of claim 1, further comprising a mounting fixture joined to the support body of the device and pivotably joined to a directionally dependent device.

3. The optical targeting device of claim 2, wherein the mounting fixture is comprised of a first adjustment mechanism operable to adjust the position of the support body and imaging waveguide relative to the directionally dependent device around a first axis perpendicular to a longitudinal axis of the directionally dependent device, and a second adjustment mechanism operable to adjust the position of the support body and imaging waveguide relative to the directionally dependent device around a second axis perpendicular to the longitudinal axis of the directionally dependent device.

4. The optical targeting device of claim 3, wherein the directionally dependent device is selected from the group consisting of a camera, a surveying device, a medical device, and an infrared optical sensing device.

5. The optical targeting device of claim 3, wherein the directionally dependent device is a weapon adapted to fire a projectile at a target point in the scene and wherein adjustment of at least one of the first adjustment mechanism and the second adjustment mechanism causes the point of light superimposed within the scene viewable by the user to coincide with the target point in the scene viewable by the user.

6. The optical targeting device of claim 5, wherein the weapon is selected from the group consisting of a rifle, a handgun, a pistol, a cannon, a grenade launcher, a missile, a crossbow, and an archery-bow.

7. The optical targeting device of claim 1, further comprising a mounting fixture joined to the support body of the device, and adapted to be removably joined to a directionally dependent device, and comprised of a first adjustment mechanism operable to adjust an angle of the targeting light beam relative to the support body around a first axis perpendicular to the incoming light from the scene, and a second adjustment mechanism operable to adjust the angle of the targeting light beam relative to the support body around a second axis perpendicular to the incoming light from the scene.

8. The optical targeting device of claim 7, wherein the directionally dependent device is selected from the group consisting of a camera, a surveying device, a medical device, an infrared optical sensing device.

9. The optical targeting device of claim 7, wherein adjustment of at least one of the first adjustment mechanism and the second adjustment mechanism causes the point of light superimposed within the scene viewable by the user to move to a different location within the scene viewable by the user.

10. The optical targeting device of claim 9, wherein the directionally dependent device is a weapon adapted to fire a projectile at a target point in the scene and wherein adjustment of at least one of the first adjustment mechanism and the second adjustment mechanism causes the point of light superimposed within the scene viewable by the user to move to the target point in the scene viewable by the user.

11. The optical targeting device of claim 10, wherein the weapon is selected from the group consisting of a rifle, a handgun, a pistol, a cannon, a grenade launcher, a missile, a crossbow, and an archery-bow.

12. The optical targeting device of claim 1, wherein the light source is selected from the group consisting of a light emitting diode, a laser, an illuminated reticle, and a holographic reticle.

13. The optical targeting device of claim 1, wherein the light source is a holographic reticle.

14. The optical targeting device of claim 1, wherein the light source is an illuminated reticle.

15. The optical targeting device of claim 1, wherein propagation of the targeting light beam from the input diffractive optic laterally through the waveguide includes at least three reflections between the first and second parallel walls of the waveguide.

16. The optical targeting device of claim 1, wherein propagation of the targeting light beam from the input diffractive optic laterally through the waveguide includes five reflections between the first and second parallel walls of the waveguide.

17. The optical targeting device of claim 1, wherein the input diffractive optic and the output diffractive optic are linear diffraction gratings.

18. An optical targeting device comprising:
   a) a support body;
   b) a light source mounted on the support body;
   c) an imaging waveguide joined to and in a position relative to the support body and comprising an input-coupling-element and an output-coupling-element operable to direct a point image of the light source to a user of the optical targeting device;
   wherein the imaging waveguide is adapted to simultaneously transmit incoming light from a scene viewable by the user of the device through imaging waveguide, and direct the point image of the light source laterally through the waveguide by multiple reflections between first and second parallel walls of the waveguide to the user of the optical targeting device, thereby rendering the point image of the light source superimposed within the scene viewable by the user.

19. The optical targeting device of claim 18, wherein the imaging waveguide is further comprised of an intermediate grating operable as a beam expander.

20. The optical targeting device of claim 18, wherein the light source is selected from the group consisting of an LED, a laser, an illuminated reticle, and a holographic reticle.

21. The optical targeting device of claim 18, wherein the input-coupling-element is selected from the group consisting of a diffractive optical element, a mirror, and a prism.

22. The optical targeting device of claim 18, wherein the output coupling-element is selected from the group consisting of a diffractive optical element, a mirror, and a prism.

23. An optical targeting device comprising:
   a) a support body;
   b) an image projection source mounted on the support body;
   c) an imaging waveguide joined to and in a position relative to the support body and comprising first and second parallel walls, an input-coupling-element, and an output-coupling-element, the imaging waveguide operable to direct a projected image from the image projection source to a user of the optical targeting device;
   wherein the imaging waveguide is adapted to simultaneously transmit incoming light from a scene viewable by the user of the device through imaging waveguide, and direct the projected image laterally through the waveguide by multiple reflections between first and second parallel walls of the waveguide to the user of the optical targeting device, thereby rendering the projected image superimposed within the scene viewable by the user.

* * * * *